J. A. HOLLOWAY.
HOSE COUPLING.
APPLICATION FILED MAR. 19, 1913.
1,081,963.
Patented Dec. 23, 1913.
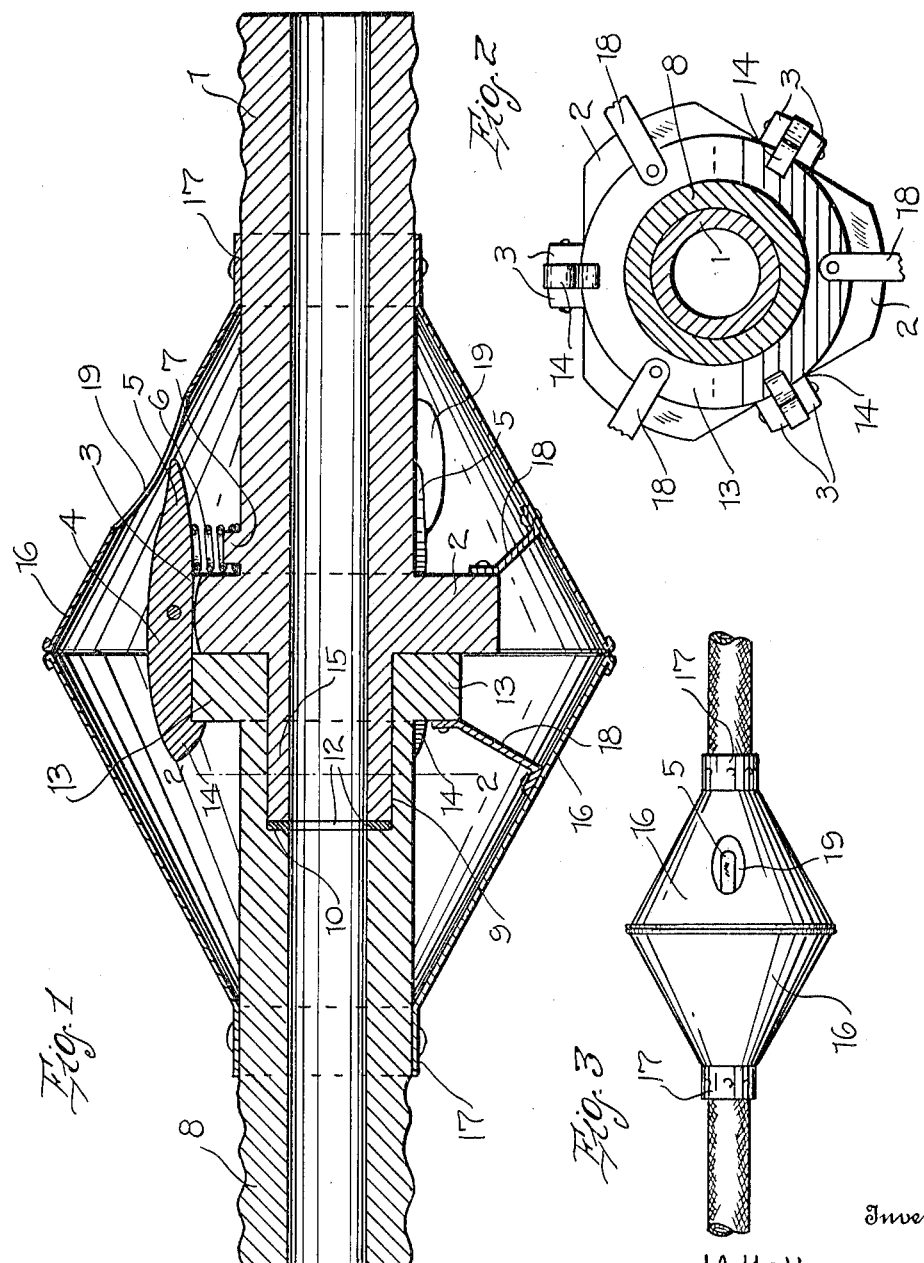
Witnesses
Robert M. Sutphen.
A. I. Hind.
Inventor
J. A. Holloway
By Watson E. Coleman
Attorney

UNITED STATES PATENT OFFICE.

JESSE A. HOLLOWAY, OF BOWDON, GEORGIA.

HOSE-COUPLING.

1,081,963.  Specification of Letters Patent.  Patented Dec. 23, 1913.

Application filed March 19, 1913. Serial No. 755,492.

*To all whom it may concern:*

Be it known that I, JESSE A. HOLLOWAY, a citizen of the United States, residing at Bowdon, in the county of Carroll and State of Georgia, have invented certain new and useful Improvements in Hose-Couplings, of which the following is a specification, reference being had to the accompanying drawings.

This invention relates to new and useful improvements in hose couplings, and more particularly to an improved guard for the same, the object of the invention being to provide a guard member for hose couplings of the pivot dog type, wherein the dogs are protected against accidental disengagement so that the coupling sections will not become disengaged.

Another object of the invention is to provide an improved device of this character which will possess advantages in points of efficiency and durability, is inexpensive to manufacture and at the same time is simple in construction and operation.

With the above and other objects in view, this invention consists in the novel features of construction, combination and arrangement of parts hereinafter more fully described, pointed out in the claims, and shown in the accompanying drawings, in which—

Figure 1 is a longitudinal sectional view of a hose coupling constructed in accordance with my invention; Fig. 2 is a transverse sectional view taken on the line 2—2 of Fig. 1; and Fig. 3 is a side elevation.

Referring more particularly to the drawings, 1 indicates the male section of the coupling which is provided adjacent one end thereof with an annular flange 2, having several pairs of spaced ears 3 formed upon the periphery thereof and between which are mounted the pivoted engaging dogs 4. The dogs 4 are provided with suitable handle members 5 and arranged between the handle members and the body of the section 1 are the coil springs 6 which are adapted to normally hold the dogs in their locked position. The coil springs 6 are suitably mounted upon the upwardly projecting lugs 7 formed integrally upon the periphery of the section 1. The female section 8 is provided with a receiving socket 9, having a cut away portion providing a suitable annular shoulder 10, upon which is mounted a rubber packing ring 12.

The female section 8 is provided at one end with an annular flange 13 which is adapted to be engaged by the locking ends 14 of the pivoted dogs 4 to securely lock the two sections together. The end 15 of the male section 1 is adapted to be disposed within the socket 9 and rest upon the rubber packing ring 12 to prevent any leakage of water or other fluid at this point. In locking the two sections together, the end 15 of the section 1 is inserted within the socket 9, the locking ends 14 of the pivoted dogs 4 engaging over the periphery of the flange 13, the springs 7 normally holding the dogs into locking engagement with the flange 13 to prevent the sections from pulling apart until pressure is exerted upon the handle members 5.

In order to prevent the handle members 5 from being accidentally actuated, I provide cone-shaped guard members 16, the reduced ends of which are securely fastened to the coupling sections, as shown at 17. The outer enlarged ends of the guards are arranged so that when the coupling sections are locked together, the ends of the guards will abut, as shown in Fig. 1, and completely inclose the coupling. Brace members 18 are arranged within the guard members and disposed between the coupling sections and the guard members to prevent the guard members from being pressed inwardly by any weight thereon. One of the guard members is provided with circularly arranged elongated openings 19, said openings being disposed in alinement with the annular members 5 of the pivoted dogs 4 so that access may be readily gained to the interior of the guard member to manipulate the dogs. It will be readily apparent that the dogs 4 may be quickly and easily released by inserting the fingers through the openings 19 and engaging the same with the handle members 5.

From the above description taken in connection with the accompanying drawings, it will be readily apparent that I have provided a simple and durable means adapted to be applied to hose couplings of the pivoted dog type wherein the dogs are guarded against accidental displacement when the coupling is in use. It will also be apparent that the device is extremely simple in construction and can be manufactured at comparatively low cost.

While I have shown and described the preferred form of my invention, it will be obvious that various changes in the details of construction and in the proportions may be resorted to for successfully carrying my invention into practice without sacrificing any of the novel features as defined in the appended claims.

What is claimed is:—

1. In a hose coupling, the combination with a female section having an annular flange at one end, a male section having a reduced portion engaged in the female section and provided with an annular flange at the inner end of the reduced portion, spaced ears arranged in pairs and projecting radially from the periphery of the flange of the male section, locking dogs pivoted in the pairs of ears and engaged with the flange of the female section, means for resiliently retaining the dogs in engagement with the last mentioned flange, flared guard members secured at their reduced portions to the male and female sections at spaced distances from the ends thereof and inclosing the same, the large portions of the guard members being engaged, one of said guard members being provided with openings through which the free ends of the dogs may be engaged to disengage the dogs from the flange of the female section, and bracing means secured to the guard members and to the flanges of the sections.

2. In a hose coupling, the combination with a male section having a flange at one end, a female section having a flange at one end, said male section having a reduced portion engaged in the female section and having its flange provided with flattened portions, ears arranged in pairs upon the flattened portions of the flange and projecting from the periphery of said flange, locking dogs pivoted in the pairs of ears and engaged over the flange of the female section, means for resiliently retaining the dogs in operative position, flared guard members secured at their reduced portions to the male and female sections at spaced distances from the flanged ends thereof and inclosing the same, the large portions of the guard members being engaged with one another, one of said guard members being provided with openings through which the upper ends of the dogs may engage to disengage the dogs from the flange of the female section, and bracing means secured to the guard members and to the flanges of the sections.

In testimony whereof I hereunto affix my signature in the presence of two witnesses.

JESSE A. HOLLOWAY.

Witnesses:
 G. W. JONES,
 J. E. LOUVOM.

---

Copies of this patent may be obtained for five cents each, by addressing the "Commissioner of Patents, Washington, D. C."